United States Patent [19]

Ganter

[11] Patent Number: 4,925,597

[45] Date of Patent: May 15, 1990

[54] METHOD FOR THE DECONTAMINATION OF RADIOACTIVELY CONTAMINATED LIQUIDS

[76] Inventor: Martin Ganter, Bischhof 3, 2213 Landrecht, Fed. Rep. of Germany

[21] Appl. No.: 275,137

[22] PCT Filed: Dec. 21, 1987

[86] PCT No.: PCT/DE87/00604

§ 371 Date: Oct. 12, 1988

§ 102(e) Date: Oct. 12, 1988

[87] PCT Pub. No.: WO88/05204

PCT Pub. Date: Jul. 14, 1988

[30] Foreign Application Priority Data

Dec. 24, 1986 [DE] Fed. Rep. of Germany ....... 3644396

[51] Int. Cl.[5] .......................... G21F 9/08; C09K 3/00; C10M 175/00; C10G 17/06

[52] U.S. Cl. .................................... 252/631; 208/181; 208/183; 208/188; 208/224; 208/252; 208/266; 208/270; 208/271; 210/806; 252/635; 494/901

[58] Field of Search ..................... 208/48 R, 181, 183, 208/188, 224, 251 R, 252, 266, 267, 270, 271, 293; 252/631; 210/737, 774, 806; 494/901

[56] References Cited

U.S. PATENT DOCUMENTS

| | | | |
|---|---|---|---|
| 1,409,763 | 3/1922 | Paul, Jr. | 208/266 |
| 1,908,616 | 5/1933 | Petty | 208/270 |
| 2,852,438 | 9/1958 | Van Dyck Fear et al. | 208/267 |
| 3,094,570 | 6/1963 | Kemp | 208/266 |
| 3,265,614 | 8/1966 | Matthew | 208/252 |
| 4,552,646 | 11/1985 | Stapp | 208/252 |
| 4,615,794 | 10/1986 | Belanger | 208/181 |

FOREIGN PATENT DOCUMENTS

| | | |
|---|---|---|
| 1218964 | 8/1966 | Fed. Rep. of Germany . |
| 3318377 | 5/1986 | Fed. Rep. of Germany . |
| 3513943 | 10/1986 | Fed. Rep. of Germany . |
| 1211816 | 11/1970 | United Kingdom . |
| 2073477 | 10/1981 | United Kingdom . |

*Primary Examiner*—Howard J. Locker
*Attorney, Agent, or Firm*—Herbert W. Larson

[57] ABSTRACT

In a process for decontaminating radioactively polluted lubricant oil, (a) the lubricant oil to be decontaminated is mechanically filtered, (b) an acid solution of the salts of the elements, the radionuclides of which are to be removed, is added, and (c) a dose of a precipitating agent that cooperates with the elements, the radionuclides of which are to be removed, producing a salt of low solubility, is added, (d) the acid salt solution is intimately mixed with the lubricant oil after step (b), (e) the depositing aqueous phase is discharged after step (b), before step (c), (f) additional intimate mixing is carried out after the dosed admixture of step (c), and (g) finally the precipitation products are separated by centrifugation from the lubricant oil.

16 Claims, No Drawings

METHOD FOR THE DECONTAMINATION OF RADIOACTIVELY CONTAMINATED LIQUIDS

BACKGROUND OF THE INVENTION

The invention relates to a method for the decontamination of radioactively contaminated liquids.

A method for the decontamination of radioactive liquids is known from the DE-AS 12 18 964. In this method the liquid to be decontaminated is mechanically filtered, an acid solution of the elements whose radionuclids are to be removed is added, and the products of precipitation are separated from the liquid.

Furthermore methods both for separating radioactive isotopes from liquids and gases (see De-OS 35 13 943), and for the decontamination of radioactively contaminated scrap-iron and/or-steel (see DE-OS 33 18 377) are known.

The aim of the invention is the further development of the above mentioned method for the decontamination of lubricating oil.

SUMMARY OF THE INVENTION

According to the invention this aim is achieved by the features of the characterizing part of claim 1. The sub claims give details of advantageous forms of the invention.

DETAILED DESCRIPTION OF THE INVENTION

According to the invention, the addition of an acid solution, preferably in a aqueous sulfuric acid, of a salt of the element or elements respectively, whose radionuclids are to be removed, to the lubricating oil which is regularly first to be mechanically filtered, is suggested. For example, for the removal of radionuclids of cobalt a 2% sulfuric acid in which the cobalt chloride is dissolved can be added. This acid solution of the salt is to be thoroughly mixed with the lubricating oil, preferably being heated at the same time, over a lengthy period, forming an emulsion. The sulfuric acid thus causes a disassociation of the metal oxides and other metal salts in the aqueous sulfuric acid phase of the lubricating oil emulsion. The now freely mobile active cobalt ions including any respective radionuclids exchange with the inactive cobalt ions of the added cobalt salt. If this constant substitution process is maintained over a sufficiently long period the thorough mixing will not continue further. The aqueous sulfuric acid is deposited with the cobalt salt dissolved in it and the cobalt ions in the depositing phase consists of active and inactive ions. Already in this first step a considerable decontamination effect is achieved.

In a next step an aqueous solution of the salt of a precipitation partner of the element whose radionuclids are to removed (in this example cobalt) is added in doses, whereby this partner may be sodium sulphide. Now too a thorough mixing of the salt, preferably under simultaneous eating, takes place. The increase in the number of cobalt ions in the lubricating oil via the addition of cobalt salt in the first step causes a definite exceeding of the solution threshold and allows suitable precipitation. In a further step the precipitation products are separated from the lubricating oil, preferably with the use of a centrifuge.

Experiments have shown that in the suggested method the level of radionuclids remaining in the lubricating oil lies, already after one run-through, in the vicinity of the usual measureable proof level. When after one run-through a given limit is not reached, then some or all of the steps of the suggested method may be repeated until the active elements remaining in the lubricating oil lie below the limit.

The parameters of the process have to be chosen according to the given conditions, especially according to the composition of the lubricating oil to be decontaminated and the type and intensity of radioactive pollution.

When removing radionuclids of different elements various specific salt solution can be added simultaneously.

I claim:

1. Method for the decontamination of radioactively contaminated lubricating oil, in which
   (a) the lubricating oil to be decontaminated is mechanically filtered,
   (b) afterwards an acid salt solution of the elements, whose radionuclids are to be removed is added and
   (c) a precipitation partner, which results together with the elements whose radionuclids are to be removed in a relatively insoluble salt, is added in doses, characterized in that
   (d) after step (b) the acid salt solution is thoroughly mixed with the lubricating oil,
   (e) after step (b) and before step (c) the depositing aqueous phase is drained off,
   (f) after the dosed addition in step (c) a further thorough mixing takes place, and
   (g) finally the precipitation products are separated by centrifuge from the lubricating oil.
2. Method according to claim 1, wherein the lubricant oil is filtered after separation by centrifugation.
3. Method according to claim 1 wherein the lubricating oil is heated while the acid salt solution is being mixed with the lubricating oil.
4. Method according to claim 2 wherein the lubricating oil is heated while the acid salt solution is being mixed with the lubricating oil.
5. Method according to claim 1 wherein an additional drainage of a phase which deposits after the addition of the salt solution of the precipitation partner is conducted prior to the centrifugation.
6. Method according to claim 2 wherein an additional drainage of a phase which deposits after the addition of the salt solution of the precipitation partner is conducted prior to the centrifugation.
7. Method according to claim 3 wherein an additional drainage of a phase which deposits after the addition of the salt solution of the precipitation partner is conducted prior to the centrifugation.
8. Method according to claim 4 wherein an additional drainage of a phase which deposits after the addition of the salt solution of the precipitation partner is conducted prior to the centrifugation.
9. Method according to claim 1 wherein the acid salt solution is an aqueous sulfuric acid.
10. Method according to claim 2 wherein the acid salt solution is an aqueous sulfuric acid.
11. Method according to claim 3 wherein the acid salt solution is an aqueous sulfuric acid.
12. Method according to claim 4 wherein the acid salt solution is an aqueous sulfuric acid.
13. Method according to claim 5 wherein the acid salt solution is an aqueous sulfuric acid.
14. Method according to claim 13 wherein the acid salt solution is an aqueous sulfuric acid.
15. Method according to claim 7 wherein the acid salt solution is an aqueous sulfuric acid.
16. Method according to claim 8 wherein the acid salt solution is an aqueous sulfuric acid.

* * * * *